United States Patent [19]

Reddy

[11] Patent Number: 4,929,386

[45] Date of Patent: May 29, 1990

[54] PROCESS FOR PREPARING A NIOBIUM ACTIVATED YTTRIUM TANTALATE X-RAY PHOSPHOR

[75] Inventor: Vaddi B. Reddy, Sayre, Pa.

[73] Assignee: GTE Products Corporation, Stamford, Conn.

[21] Appl. No.: 362,721

[22] Filed: Jun. 7, 1989

[51] Int. Cl.$^5$ .............................................. C09K 11/78
[52] U.S. Cl. ............................................. 252/301.4 R
[58] Field of Search ................................. 252/301.4 R

[56] References Cited

U.S. PATENT DOCUMENTS

| | | | |
|---|---|---|---|
| 3,459,674 | 8/1969 | Emoto et al. | 252/301.4 R |
| 4,024,069 | 5/1977 | Larach | 252/301.4 R |
| 4,225,653 | 9/1980 | Brixner | 252/301.4 |

FOREIGN PATENT DOCUMENTS

| | | | |
|---|---|---|---|
| 202875 | 11/1986 | European Pat. Off. | 252/301.4 R |
| 49-34311 | 9/1974 | Japan | 252/301.4 R |

OTHER PUBLICATIONS

"On the Structural and Luminescent Properties of the M'LnTaO$_4$ Rare Earth Tantalates", Brixner & Chen, Electrochem. Soc. 130 (12), 1983, 2435–43.

*Primary Examiner*—Jack Cooper
*Attorney, Agent, or Firm*—L. Rita Quatrini; Robert E. Walter

[57] ABSTRACT

A process is disclosed for preparing a single phase M'YTaO$_4$:Nb X-ray phosphor which comprises firing a uniform milled mixture consisting essentially of the components of Y$_2$O$_3$, Ta$_2$O$_5$, and Nb$_2$O$_5$ in an amount equal to the stoichiometric amounts to form the phosphor, with a flux consisting essentially of lithium sulfate and potassium sulfate in a mole ratio of about 80 to 20, wherein the flux makes up from about 25% to about 50% by weight of the mixture. The firing is done by heating in a furnace to a temperature of from about 1200° C. to about 1300° C. at a heating rate of from about 1.0° C. per minute to about 1.5° C. per minute and maintaining the temperature for about 10 to 14 hours to react the components and produce a fired material containing luminescent material. The material is cooled by turning off the heat to the furnace and allowing the fired material to remain in the furnace until the temperature in the furnace is no higher than about 300° C. The material is washed, dried, and classified to obtain a −325 mesh particle size. The phosphor essentially free of the impurity phases of Y$_3$TaO$_7$, the freedom from the impurity phases resulting in an improvement in brightness over phosphors produced by prior methods and having the impurity phases present.

4 Claims, No Drawings ously and often results in the formation of $Y_3TaO_7$ as an impurity phase along with $M'YTaO_4$. This impurity phase causes a decrease in the luminescence efficiency in $M'YTaO_4$:Nb phosphor.

PROCESS FOR PREPARING A NIOBIUM ACTIVATED YTTRIUM TANTALATE X-RAY PHOSPHOR

CROSS REFERENCE TO RELATED APPLICATIONS

This application is related to application Ser. No. 362,720 entitled "A Freon-Free Process For Preparing a Niobium Activated Yttrium Tantalate X-ray Phosphor", and application Ser. No. 362,717, entitled "Process For Improving The Luminescence Of Niobium Activated Yttrium Tantalate X-Ray Phosphor", both assigned to the same assignee as the present application and both filed concurrently herewith.

BACKGROUND OF THE INVENTION

This invention relates to a process for preparing a single phase niobium activated yttrium tantalate X-ray phosphor having an M' crystal structure by a method in which the nature of the flux is critical and in which the heating and cooling schedules are critical. The phosphor has essentially no impurity phases and exhibits a brightness improvement of at least about 10% over these types of phosphors produced by prior methods.

X-ray phosphors are used in x-ray intensifying screens which are used along with photographic film to enhance the photographic image formed on the film at the same time reducing the x-ray dose on the object during medical radiographic procedures. Phosphor materials used in these intensifying screens are to be colorless single phase with a polyhedral shape of well-defined crystal morphology. Also, the phosphors have to be good x-radiation absorbers and emit the light (energy) in the spectral region to which the photographic film is sensitive. Generally, it is required that the phosphor particle size be about 4–11 micrometers in order to form a thin layer when drawn in the form of screens using certain binder solutions as media. The phosphor material also has to have a high x-ray energy absorbing property. After absorbing the x-ray energy, when exposed, the phosphor should emit photons (light) strongly in the spectral region of the film sensitivity. The efficiency of x-ray energy-to-light conversion should be intense enough to obtain undistorted and sharp film images. There are several materials of such kind but only few have good properties necessary to make them as useful materials for intensifying screen applications.

Blasse and Bril (J. Luminescence, 3,109 (1970)) describes the cathodo and photo luminescence properties of various rare-earth tantalate phosphors. These material have fergunsonite (M-type) monoclinic crystal structure. Wolten & Chase (American Mineralogist, 52, 1536 (1967)) report that this type of tantalates (e.g. $YTaO_4$ and similar rare-earth tantalates) have two polymorphs, a monoclinic ($I_2$ Space group) structure-M at low temperature and a tetragonal (Scheelite type structure with $I_{41/a}$ space group) at high temperature. Crystal structure transition between these two forms occur at 1325° C. in $YTaO_4$ and is reversible. They also disclose the formation of a new polymorph of yttrium tantalate and other rare earth tantalates. This new polymorph is obtained when the tantalates are synthesized (crystallized) below the above mentioned (1325° C.) transformation temperature and this polymorph has a monoclinic structure with $P_{2/a}$ space group which is called M' phase. M' phase can be converted to M phase by heating above 1400° C. and then cooling to below the transition (1325° C.) temperature Brixner and Chen (J. Electrochemical Soc., 130 (12), 1983, 2435–43) and U.S. Pat. No. 4,225,553 describe the preparation and the crystal structure of M' phase rare earth tantalate materials and their luminescence properties. They also demonstrate that the M' phase $yTaO_4$ is an efficient host for x-ray phosphor when activated with niobium and some rare earth ions. However, it has been found that the preparation procedure is critical to obtain a single phase $M'YTaO_4$ with increased brightness when activated with niobium. Brixner and Chen recommend the preparation of niobium activated M' rare earth tantalate phosphor by pre-firing the component oxides $TaO_5$, $NbO_5$, and $Ln_2O_3$ (Ln=La, Y, Ce, and Lu) at 1200° C. for 8–10 hours. The reaction products are then milled using freon solvent as grinding fluid for about 6 hours using alumina beads as grinding medium. The resulting mixture is then either alone or with 50% by weight lithium sulfate as flux material, fired at 1250° C. for 10–14 hours. This procedure is cumbersome and often results in the formation of $Y_3TaO_7$ as an impurity phase along with $M'YTaO_4$. This impurity phase causes a decrease in the luminescence efficiency in $M'YTaO_4$:Nb phosphor.

SUMMARY OF THE INVENTION

It is an object of the present invention to provide a process for producing a single phase M' $YTaO_4$:Nb x-ray phosphor that is free of $Y_3TaO_7$ phase.

It is another object of the present invention to provide a process for producing a single phase M' $YTaO_4$:Nb x-ray phosphor having a high luminescence emission efficiency over this type of phosphor produced by prior methods.

In accordance with one aspect of the invention, there is provided a process for preparing a single phase M' $YTaO_4$:Nb X-ray phosphor which comprises firing a uniform milled mixture consisting essentially of the components of $Y_2O_3$, $Ta_2O_5$, and $Nb_2O_5$ in an amount equal to the stoichiometric amounts to form the phosphor, with a flux consisting essentially of lithium sulfate and potassium sulfate in a mole ratio of about 80 to 20, wherein the flux makes up from about 25% to about 50% by weight of the mixture. The firing is done by heating in a furnace to a temperature of from about 1200° C. to about 1300° C. at a heating rate of from about 1.0° C. per minute to about 1.5° C. per minute and maintaining the temperature for about 10 to 14 hours to react the components and produce and fired material containing luminescent material. The material is cooled by turning off the heat to the furnace and allowing the fired material to remain in the furnace until the temperature in the furnace is no higher than about 300° C. The material is washed, dried, and classified to obtain a −325 mesh particle size. The phosphor essentially free of the impurity phases of $Y_3TaO_7$, the freedom from the impurity phases resulting in an improvement in brightness over phosphors produced by prior methods and having the impurity phases present.

DETAILED DESCRIPTION OF THE INVENTION

For a better understanding of the present invention, together with other and further objects, advantages and capabilities thereof, reference is made to the following disclosure and appended claims in connection with the above description of some of the aspects of the invention.

It has been demonstrated in U.S. Pat. No. 4,225,653 that the niobium substituted yttrium tantalate which crystallizes in to a monoclinic M' structure gives high x-ray-to-light-conversion efficiency compared to those host materials that crystallize into monoclinic M-structure of the composition that has the same formula, $YTaO_4$. Substitution of niobium for tantalum improves significantly the blue fluorescence of M' structure $YTaO_4$. However, it has been discovered that another impurity phase $Y_3TaO_7$ is normally formed along with M'$YTaO_4$ which reduces the luminescence efficiency of the niobium activated yttrium tantalate phosphor. The object of this invention is to prepare $Y_3TaO_7$-free single phased M'$YTaO_4$. Another object of this invention is to improve the luminescence emission of the $YTa_{1-x}Nb_xO_4$ phosphor to give better quality radiographs when used in intensifying screens. The description of the preparation of the phosphor of the present invention is as follows.

A uniform mixture is formed consisting essentially of the components from which the phosphor is to be made and a flux. The components are $Y_2O_3$, $Ta_2O_5$, and $Nb_2O_5$. The components are provided in an amount equal to approximately the stiochiometric amount required to form the phosphor. The flux consists essentially of lithium sulfate and potassium sulfate in a mole ratio of lithium sulfate to potassium sulfate of about 80 to 20. This is a eutectic mixture. The flux makes up from about 25% to about 50% by weight of the mixture and most preferably about 50% by weight. The mixture is formed by any known dry blending technique.

This mixture is then milled with a milling fluid. The milling fluid can be essentially any in which the oxides and flux are insoluble. Some typical milling fluids are freon, acetone and other solvents such as methyl alcohol, ethyl alcohol, and isopropanol. The normal procedure for milling is in a vibratory mill such as a SWECO mill. A preferred but nonlimiting procedure for milling, for example about 660 g of components and an equal amount of flux material is to mill for about 1.0 hours with about 500–600 ml of milling fluid such as freon or acetone using about 2 kg of 0.25" high density alumina beads as milling media.

After the milling step, the milling media and milling fluid are removed from the milled mixture. The milling fluid is removed by allowing the milled mixture and fluid to dry usually at room temperature for a sufficient time to allow all the fluid to evaporate. This amount of time is usually about 6 to 12 hours when freon is used.

An alternate method is to form a first mixture of the reactive components and then to mill this first mixture with a milling fluid as described above. The flux can then be added to this first mixture to form a second mixture.

In any case the reactive components and the flux are then fired according to the following specific heating schedule to produce a fired material containing luminescent material. The reactive component-flux mixture is loaded into a furnace typically an electric or gas-fired furnace, preferably in covered alumina containers. The furnace is then heated slowly from a starting temperature which is normally below about 300° C. up to a temperature of from about 1200° C. to about 1300° C. at a heating rate of from about 1.0° C. per minute to about 1.5° C. per minute. This usually takes about several hours. This temperature range, that is, about 1200°–1300° C., is maintained for from about 10 hours to about 14 hours.

The resulting fired material is then cooled according to a specific cooling schedule. The heat to the furnace is turned off and the fired material is allowed to remain in the furnace until the furnace has cooled to a temperature of no higher than about 300° C. When a temperature of about 300° C. or lower is reached, the cooled material can be taken out of the furnace.

The above described slow heating and cooling procedure ensures better reactivity of the components of the mixture with the flux being melted.

The resulting cooled material is then washed with deionized water to remove the fluxes and other water soluble material that may be present. This is usually done by first soaking the cooled material in hot deionized water and then slurrying repeatedly with fresh deionized water and testing for absence of sulfate. The wash water is then removed from the washed material. Other washes can be put on the material such as isopropanol or reagent alcohol to fast dry the material, but this is not necessary.

The washed material which is single phase M' niobium activated yttrium tantalate phosphor is dried usually at about 120° C. in an oven.

The phosphor is then classified to obtain a $-325$ mesh particle size.

The phosphor is free of impurity phases, in particular the $Y_3TaO_7$ phase and this results in a brightness or luminescence efficiency improvement of at least about 10% over such phosphors produced by prior methods in which this impurity phase is present.

To more fully illustrate this invention. the following nonlimiting examples are presented.

EXAMPLE 1

About 225.1 grams of $Y_2O_3$, 433.05 grams of $Ta_2O_5$, and 5.316 grams of $Nb_2O_5$ are blended. The blend is then SWECO milled in freon media for about 1 hour and the mix is allowed to dry by opening the lid of the milling jar overnight. A portion of the dried mix, about 132.83 grams is mixed with equal amounts by weight of lithium sulfate flux. This combined mixture is mixed on a roll blender for about ½ hour and then on a mechanical shaker for another ½ hour. This mix is loaded into a 500 ml size high purity alumina crucible and fired according to a slow heating program in a furnace up to about 1300° C. and held at that temperature for about 10–14 hours. The crucible is then cooled in the furnace while the furnace is shut off. The crucible is taken out of the furnace and the cakes are soaked in deionized water overnight and all the sulfate is leached out in subsequent hot and cold deionized water washes. The product is filtered and rinsed with isopropanol and dried at about 120° C. for about 1–2 hours. The dried material is sleeved through a $-325$ mesh screen and examined by x-ray diffraction analysis. This analysis reveals the presence of $Y_3TaO_7$ phase in addition to the M'$YTaO_4$ phase. The sample is measured for its luminescence emission efficiency by x-ray optical fluoescence emission technique. The stoichiometry of the phosphor is $YNb_{0.02}Ta_{0.98}O_4$.

EXAMPLE 2

Required amounts of $Y_2O_3$, $Ta_2O_5$, and $Nb_2O_5$ to give a stiochiometric ratio of $YNb_{0.02}Ta_{0.98}O_4$ are mixed with an equal amount of $Li_2SO_4$-$K_2SO_4$ (eutectic) flux material. The entire mixture is then ball milled in acetone and the milled mixture is dried overnight at about 80° C. to remove the acetone. The resulting dried mixture is then loaded into alumina crucibles and fired according the the conditions described in Example 1. The post-firing procedure is similar to that in Example 1. The x-ray diffraction pattern of this material is that for a clean single phase M'YTaO$_4$ and the phosphor XOF brightness is increased by about 10-11% over that of Example 1.

The data from examples 1 and 2 is shown in Table 1 below.

TABLE 1

| Example | Flux System | XOF Brightness | X-ray diffraction |
|---|---|---|---|
| 1 | Li$_2$SO$_4$ | 100 | Y$_3$TaO$_7$ present |
| 2 | Li$_2$SO$_4$/ K$_2$SO$_4$ | 110.5 | Single phase (M'YTAO$_4$) present |

The above examples show that use of the flux of the present invention results in a clean phosphor as opposed to use of lithium sulfate alone.

While there has been shown and described what are at present considered the preferred embodiments of the invention, it will be obvious to those skilled in the art that various changes and modifications may be made therein without departing from the scope of the invention as defined by the appended claims.

What is claimed is:

1. A process for preparing a single phase M'YTaO$_4$:Nb X-ray phosphor, said process comprising:
    (a) forming a uniform mixture consisting essentially of Y$_2$O$_3$, Ta$_2$O$_5$, and Nb$_2$O$_5$ components, and a flux consisting essentially of lithium sulfate and potassium sulfate in a mole ratio of lithium sulfate to potassium sulfate of about 80 to 20, wherein said flux makes up from about 25% to about 50% by weight of said mixture, said components being provided in an amount equal to approximately the stoichiometric amounts required to form said phosphor;
    (b) milling said mixture with a milling fluid in which said components and flux are insoluble;
    (c) removing said milling fluid from the resulting milled mixture;
    (d) firing said milled mixture in a furnace by heating said mixture in said furnace from a temperature below about 300° C. to a temperature of from about 1200° C. to about 1300° C. at a heating rate of from about 1.0° C. per minute to about 1.5° C. per minute and maintaining said temperature for from about 10 hours to about 14 hours to react said components and produce a fired material containing luminescent material;
    (e) cooling the resulting fired material by turning off the heat to said furnace and allowing said fired material to remain in said furnace until the temperature in said furnace is no higher than about 300° C.;
    (f) washing the resulting cooled material with deionized water to remove essentially all of said flux therefrom and produce a washed single phase M' niobium activated yttrium tantalate phosphor;
    (g) removing the wash water from and drying said washed phosphor; and
    (h) classifying the resulting dried phosphor to obtain a $-325$ mesh particle size in said phosphor, said phosphor being essentially free of Y$_3$TaO$_7$ phase.

2. A process of claim 1 wherein said milling fluid is selected from the group consisting of freon and acetone.

3. A process for preparing a single phase M' YTaO$_4$:Nb X-ray phosphor, said process comprising:
    (a) forming a uniform first mixture consisting essentially of Y$_2$O$_3$, Ta$_2$O$_5$, and Nb$_2$O$_5$ components, said components being provided in an amount equal to approximately the stoichiometric amounts required to form said phosphor;
    (b) milling said first mixture with a milling fluid in which said components and the flux used in (d) are insoluble;
    (c) removing said milling fluid from the resulting milled first mixture;
    (d) forming a uniform second mixture consisting essentially of said first mixture and a flux consisting essentially of lithium sulfate and potassium sulfate in a mole ratio of lithium sulfate to potassium sulfate of about 80 to 20, wherein said flux makes up from about 25% to about 50% by weight of said second mixture;
    (e) firing said second mixture in a furnace by heating said mixture in said furnace from a temperature below about 300° C. to a temperature of from about 1200° C. to about 1300° C. at a heating rate of from about 1.0° C./minute to about 1.5° C. per minute and maintaining said temperature for from about 10 hours to about 14 hours to react said components and produce a fired material containing luminescent material;
    (f) cooling the resulting fired material by turning off the heat to said furnace and allowing said fired material to remain in said furnace until the temperature in said furnace is no higher than about 300° C.;
    (g) washing the resulting cooled material with deionized water to remove essentially all of said flux therefrom and produce a washed single phase M' niobium activated yttrium tantalate phosphor;
    (h) removing the wash water from and drying said washed phosphor; and
    (i) classifying the resulting dried phosphor to obtain a $-325$ mesh particle size in said phosphor, said phosphor being essentially free of Y$_3$TaO$_7$ phase.

4. A process of claim 3 wherein said milling fluid is selected from the group consisting of freon and acetone.

* * * * *